United States Patent
Luykx et al.

(10) Patent No.: US 11,818,263 B2
(45) Date of Patent: Nov. 14, 2023

(54) COMPUTING KEY ROTATION PERIOD FOR BLOCK CIPHER-BASED ENCRYPTION SCHEMES SYSTEM AND METHOD

(71) Applicant: Visa International Service Association, San Francisco, CA (US)

(72) Inventors: Atul Luykx, San Francisco, CA (US); Wei Dai, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 275 days.

(21) Appl. No.: 17/285,293

(22) PCT Filed: Oct. 25, 2019

(86) PCT No.: PCT/US2019/058205
§ 371 (c)(1),
(2) Date: Apr. 14, 2021

(87) PCT Pub. No.: WO2020/149913
PCT Pub. Date: Jul. 23, 2020

(65) Prior Publication Data
US 2021/0351924 A1    Nov. 11, 2021

Related U.S. Application Data

(60) Provisional application No. 62/751,068, filed on Oct. 26, 2018.

(51) Int. Cl.
*H04L 29/06* (2006.01)
*H04L 9/08* (2006.01)
*H04L 9/06* (2006.01)

(52) U.S. Cl.
CPC ............ *H04L 9/0891* (2013.01); *H04L 9/083* (2013.01); *H04L 9/088* (2013.01); *H04L 9/0618* (2013.01); *H04L 9/0861* (2013.01)

(58) Field of Classification Search
CPC ....... H04L 9/0891; H04L 9/083; H04L 9/088; H04L 9/0618; H04L 9/0861; H04L 9/16
See application file for complete search history.

(56) References Cited

U.S. PATENT DOCUMENTS 9,177,153 B1 *  11/2015  Perrig .................... G06F 21/57
2010/0303241 A1   12/2010  Breyel
(Continued)

FOREIGN PATENT DOCUMENTS

KR    20110063676 A    6/2011

OTHER PUBLICATIONS

M. E. Hellman, "A Cryptanalytic Time—Memory Trade-Off", IEEE Transaction of Information Theory, vol. IT-26, No. 4, Jul. 1980, pp. 401-406.
(Continued)

*Primary Examiner* — Harunur Rashid
(74) *Attorney, Agent, or Firm* — Kilpatrick Townsend & Stockton LLP

(57) ABSTRACT

A method including obtaining, by a key management computer, a key rotation period based on at least an adversarial storage limit. The key management computer can then generate a first cryptographic key. The key management
(Continued)

computer can then generate a second cryptographic key to replace the first cryptographic key according to the key rotation period.

15 Claims, 4 Drawing Sheets

(56) References Cited

U.S. PATENT DOCUMENTS

| | | | |
|---|---|---|---|
| 2015/0033037 A1* | 1/2015 | Lidman | G06F 21/78 |
| | | | 713/193 |
| 2015/0310221 A1* | 10/2015 | Lietz | G06F 21/6209 |
| | | | 713/193 |
| 2017/0141916 A1* | 5/2017 | Zhang | H04L 9/0894 |

OTHER PUBLICATIONS

Durnoga et al., "One-time Programs with Limited Memory", https://eprint.iacr.org/2015/238, Cryptology ePrint Archive, Paper 2015/238 2015, pp. 1-18.

Biryukov et al., "Symmetrically and Asymmetrically Hard Cryptography (Full Version)", Cryptology ePrint Archive, https://eprint.iacr.org/2017/414, Paper 2017/414, 2017, pp. 1-34.

Auerbach et al., "Memory-Tight Reductions", Cryptology ePrint Archive, Paper 2017/675, https://eprint.iacr.org/2017/675, Apr. 12, 2018, pp. 1-26.

PCT/US2019/058205 , "International Search Report and Written Opinion", dated Jul. 28, 2020, 10 pages.

Bowers et al., "Defending Against the Unknown Enemy: Applying FlipIt to System Security", International Association for Cryptologic Research, Available online at: https://eprint.iacr.org/2012/579.pdf, Oct. 10, 2012, pp. 1-20.

EP19909852.6 , "Office Action", dated Nov. 4, 2022, 5 pages.

EP19909852.6 , "Extended European Search Report", dated Nov. 30, 2021, 4 pages.

Bowers et al., "Defending against the Unknown Enemy: Applying FlipIt to System Security", Conference: GameSec, Available online at: https://www.researchgate.net/publication/263605996_Defending_Against_the_Unknown_Enemy_Applying_FL_I_PIT_to_System_Security, Nov. 30, 2012, 16 pages.

SG11202103992U , "Written Opinion", dated Feb. 2, 2023, 7 pages.

* cited by examiner

COMPUTING KEY ROTATION PERIOD FOR BLOCK CIPHER-BASED ENCRYPTION SCHEMES SYSTEM AND METHOD

CROSS REFERENCE TO RELATED APPLICATIONS

This application is a National Stage of International Application No. PCT/US2019/058205 filed Oct. 25, 2019, which claims priority to U.S. Provisional Application No. 62/751,068 filed on Oct. 26, 2018, the contents of which are incorporated by reference in their entirety for all purposes.

BACKGROUND

Formal security analyses are used in modern cryptography. These security analyses often relate an adversary's available resources to determine if the adversary will be successful in breaking a particular cryptographic scheme. However, traditional techniques that are used to analyze the ability of an adversary to break a cryptographic scheme are often based upon the computation power (running time) of the adversary. While this can be effective in some instances, computational power may not be an accurate representation of an adversary's ability to corrupt a secure system. As a result, cryptographic keys may be replaced more often than necessary, which can waste computer resources.

Embodiments of the invention address these and other problems individually and collectively.

BRIEF SUMMARY

One embodiment is related to a method comprising: obtaining, by a key management computer, a key rotation period based on at least an adversarial storage limit; generating, by the key management computer, a first cryptographic key; and generating, by the key management computer, a second cryptographic key to replace the first cryptographic key according to the key rotation period.

Another embodiment is related to a key management computer comprising: a processor; and a computer-readable medium coupled to the processor, the computer-readable medium comprising code executable by the processor for implementing a method comprising: obtaining a key rotation period based on at least an adversarial storage limit; generating a first cryptographic key; and generating a second cryptographic key to replace the first cryptographic key according to the key rotation period.

Further details regarding embodiments of the invention can be found in the Detailed Description and the Figures.

DETAILED DESCRIPTION

Figure 1:
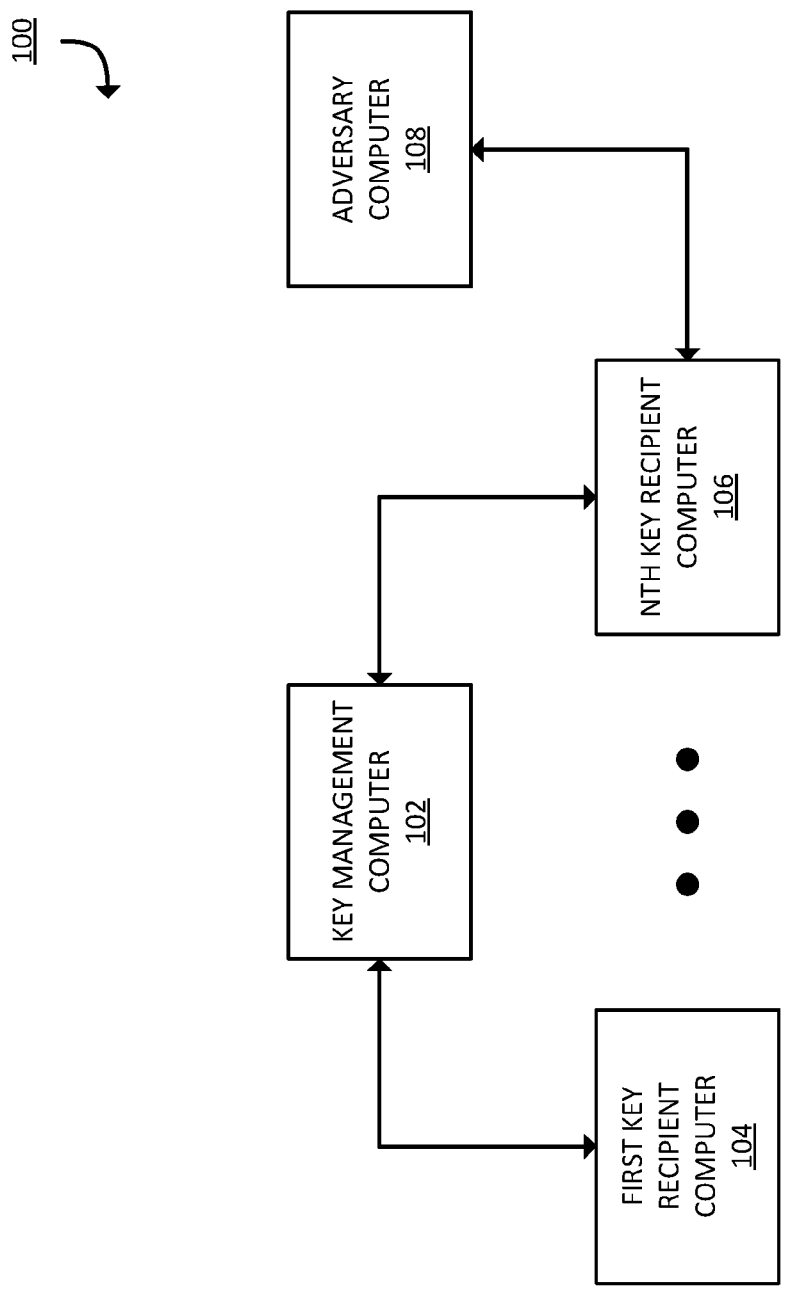
FIG. 1 shows a block diagram of a system according to embodiments.

Prior to discussing embodiments, some terms can be described in further detail.

An "adversarial storage limit" can include a data storage limit of an adversary. An adversarial storage limit can be an amount of data which an adversary (e.g., an adversarial computer, device, etc.) may store. In some embodiments, an adversarial storage limit may be a limit of memory. In some embodiments, a memory limit may be discussed in terms of fast random-access memory that can be used for fast computation. As an illustrative example, the Amazon EC2 P3 may have a storage limit of $2^{40}$ Bytes of memory (e.g., approximately 1.5 TBytes).

A "key" or "cryptographic key" may include a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "key identifier" may include any combination of letters, numbers, and/or symbols used to uniquely identify at least one key. A key identifier may be assigned randomly, consecutively, or according to any pattern or algorithm. In some embodiments, a key identifier can be derived from a key.

A "block cipher" can include a deterministic process operating on groups of bits, called blocks, with an unvarying transformation that is specified by a cryptographic key. In some embodiments, a secure block cipher can be suitable for the encryption of a single block under a fixed cryptographic key. Subsequent cryptographic keys can be created to perform further encryptions after the first cryptographic key has expired. In some embodiments, a multitude of modes of operation can be employed to allow repeated use of a cryptographic key in a secure way to allow for confidentiality and authenticity of any encrypted data.

A "block size" can include an amount of bits included in a block. Block ciphers can operate on a fixed length string of bits, where the length of the string of bits can be referred to as the block size. A block size can include any suitable size (e.g., a block size may be 64 bits, 128 bits, 192 bits, 256 bits, etc.).

A "security value" can include a value indicative of a security level. In some embodiments, the security value may be referred to as a security margin. In some embodiments, a security value can be of any suitable value which can result in an associated cryptographic process being secure. For example, the security value can be equal to a value of $2^{-10}$, or any other value.

A "key rotation period" can include repeating interval at which a first cryptographic key may be rotated for a second cryptographic key. A key rotation period may include an amount of time a cryptographic key may be used before being replaced by another cryptographic key. For example, a key rotation period may be a time of 1 day for a first cryptographic key. After 1 day of use of the first cryptographic key, a key management computer can replace the first cryptographic key with a second cryptographic key. In some embodiments, a key rotation period need not be time based. For example, a key rotation period may specify an encryption data limit for the first cryptographic key. For example, the key rotation period may be an encryption data limit of $2^{70}$ bits. After a key management computer uses a first cryptographic key to encrypt $2^{70}$ bits of data, the key management computer can begin utilizing a second cryptographic key. As another example, a key rotation period may specify a cipher call limit for the first cryptographic key. For example, the key rotation period may specify a cipher call limit for the first cryptographic key equal to, for example, $2^{63}$ calls. After the cipher calls have been made, then a key management computer can rotate to the next (e.g., second) cryptographic key.

A "plaintext" may include text that is in a plain form. For example, this may include text that is readable by a human or a computer without any processing, such as the phrase "hello, how are you?" In some embodiments, a plaintext may also include a text that is in an unencrypted form. Numbers or other symbols may also qualify as plaintext.

A "ciphertext" may include text that is in an encrypted form. For example, this could refer to text that can be decrypted before it is readable by a human or computer. Ciphertext may be generated by any number of cryptographic algorithms or cryptosystems, such as RSA (Rivest-Shamir-Adleman), AES (Advanced Encryption Standard), etc.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may include any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

I. Introduction

Traditional techniques that are used to analyze the ability of an adversary to break a cryptographic scheme is often based upon the computation power (running time) of the adversary. While this can be effective in some instances, computational power may not be an accurate representation of an adversary's ability to corrupt a secure system. As a result, cryptographic keys may be replaced more often than necessary, which can waste computer resources.

Embodiments allow for a determination of a key rotation period for rotating a cryptographic key. The key rotation period can be based on, at least, an adversarial storage limit. Determining a key rotation period based upon an adversarial storage limit can be a more accurate way of determining an appropriate key rotation period.

The adversarial storage limit can be obtained and/or determined in any suitable manner. For example, in some embodiments, the adversarial storage limit can be obtained, by the key management computer, from a security team operating the key management computer. In other embodiments, the adversarial storage limit can be determined by obtaining an initial adversarial storage limit and then determining a current adversarial storage limit using Moore's law, or other suitable mechanism for determining an estimated increase in technical development over time. For example, a determined adversarial storage limit may be increased by the key management computer by a predetermined amount, relative to a previously determined adversarial storage limit, every 6 months.

After obtaining the key rotation period, the key management computer can generate a first cryptographic key. In some embodiments, the key management computer can store the first cryptographic key in a cryptographic key database, which may be accessed by one or more key recipient computers. In other embodiments, the key management computer can provide the first cryptographic key to a key recipient computer.

After generating the first cryptographic key, the key management computer can generate a second cryptographic key to replace the first cryptographic key according to the key rotation period. For example, if the key rotation period is equal to 5 calls of a corresponding block cipher (e.g., 5 uses of the block cipher), then a second cryptographic key can be used to replace the first cryptographic key once the requirements outlined by the key rotation period are fulfilled (e.g., after 5 calls have been performed with the first cryptographic key).

II. Systems

Embodiments can include any suitable system as described herein. In some embodiments, a suitable system may be capable of performing methods as described herein. One such system is illustrated in FIG. 1 and described in further detail below.

A. Network Overview

FIG. 1 shows a system 100 comprising a number of components according to embodiments. The system 100 comprises key management computer 102, a first key recipient computer 104, and an nth key recipient computer 106. The system 100 further comprises an adversary computer 108. The key management computer 102 can be in operative communication with any suitable number of other computers. For example, the key management computer 102 can be in operative communication with the first key recipient computer 104 and the nth key recipient computer 106. Any of key management computer 102 and/or first key recipient computer 104 to nth key recipient computer 106 can act as a server computer, a client computer, or both.

For simplicity of illustration, a certain number of components are shown in FIG. 1. It is understood, however, that some embodiments may include more than one of each component.

The computers in the system 100 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The key management computer 102 can generate, manage, and/or transmit and receive symmetric, and/or public-private cryptographic keys. For example, the key management computer 102 can generate and rotate cryptographic keys for its own use to encrypt data stored by the key management computer 102 and/or decrypt data accessed by the key management computer 102. In some embodiments, the key management computer 102 can generate and rotate cryptographic keys that are used to encrypt and decrypt communications between the key management computer 102 and any of the first key recipient computer 104 to the nth key recipient computer 106. In some embodiments, the key management computer 102 can generate and rotate cryptographic keys that the key management computer 102 itself does not use, but are provisioned to the first key recipient computer 104 to the nth key recipient computer 106. The cryptographic keys provisioned by the key management computer 102 can be used by the first key recipient computer 104 to the nth key recipient computer 106 to encrypt and decrypt communications amongst themselves, or to encrypt and decrypt storage data.

In some embodiments, the key management computer 102 can obtain a key rotation period based on at least an adversarial storage limit. The key management computer 102 can then generate a first cryptographic key. After generating the first cryptographic key, the key management computer 102 can generate a second cryptographic key to replace the first cryptographic key according to the key rotation period.

A key recipient computer (e.g., the first key recipient computer 104 to the nth key recipient computer 106) can be capable of receiving the first cryptographic key and/or the second cryptographic key from the key management computer 102. In some embodiments, the key recipient computer can be capable of generating a cryptographic key request message. The cryptographic key request message may be a request message comprising a request for one or more cryptographic keys. The key recipient computer can then provide the cryptographic key request message to the key management computer 102. Upon receiving the cryptographic key request message, the key management computer 102 can determine whether or not to provide the one or more cryptographic keys to the key recipient computer. The key management computer 102 can then generate and provide a cryptographic key response message to the key recipient computer. The key recipient computer can then encrypt any suitable data with the one or more cryptographic keys received in the cryptographic key response message.

The adversary computer 108 can include any suitable computer, device, etc. operated by an adversarial entity. The adversary computer 108 can be in operative communication with the Nth key recipient computer 106. The adversary computer 108 may attempt to perform malicious actions with the Nth key recipient computer 106. In some embodiments, the adversary computer 108 can, for example, attempt to corrupt a cryptographic scheme employed by the Nth key recipient computer 106.

B. Key Management Computer

Figure 2:
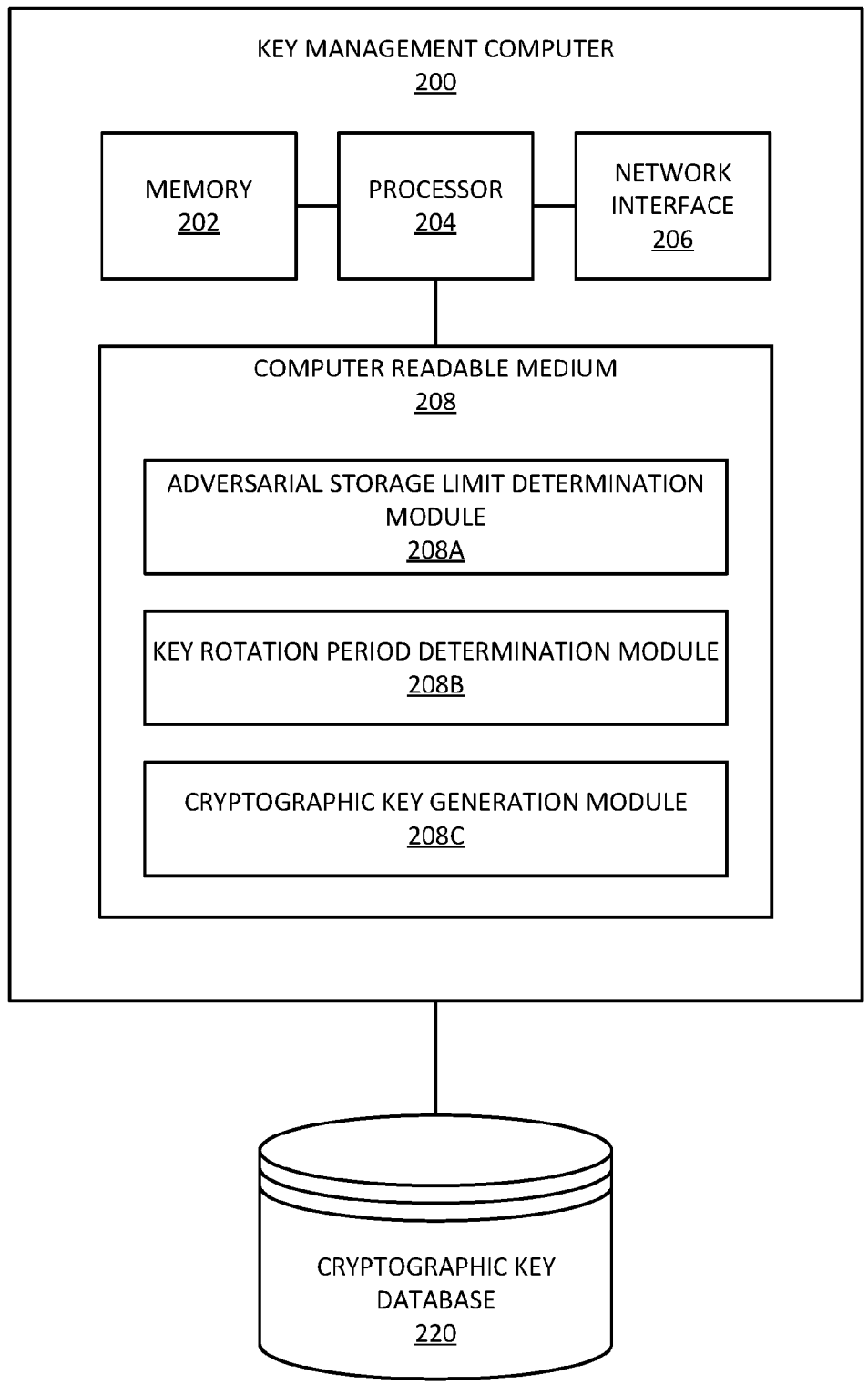
FIG. 2 shows a block diagram of a key management computer according to embodiments.

FIG. 2 shows a block diagram of a key management computer 200 according to embodiments. The exemplary key management computer 200 may comprise a processor 204. The processor 204 may be coupled to a memory 202, a network interface 206, and a computer readable medium 208. The computer readable medium 208 can comprise an adversarial storage limit determination module 208A, a key rotation period determination module 208B, and a cryptographic key generation module 208C. The key management computer 200 may be in operative communication with a cryptographic key database 220.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store cryptographic keys, and values associated with various parameters such as, but not limited to, a block cipher block size, a security values, an adversarial storage limit (e.g., in bits), a key rotation period (e.g., a data limit for a cryptographic key), etc.

The computer readable medium 208 may comprise code, executable by the processor 204, for performing a method comprising: obtaining, by a key management computer, a key rotation period based on at least an adversarial storage limit; generating, by the key management computer, a first cryptographic key; and generating, by the key management computer, a second cryptographic key to replace the first cryptographic key according to the key rotation period.

The adversarial storage limit determination module 208A may comprise code or software, executable by the processor 204, for determining a storage limit of an adversary (e.g., an adversary computer). The adversarial storage limit determination module 208A, in conjunction with the processor 204, can obtain the adversarial storage limit (e.g., as input) from a security team operating the key management computer 200. For example, the security team can analyze commercially available computers, devices, components, etc. The security team can determine an average adversarial storage limit, a high end value of the adversarial storage limit, and/or any other suitable adversarial storage limit based on the analysis of the commercially available computers. In other embodiments, the adversarial storage limit determination module 208A, in conjunction with the processor 204, can periodically increase the adversarial storage limit starting from a predetermined value. The adversarial storage limit determination module 208A, in conjunction with the processor 204, can periodically increase the adversarial storage limit based on Moore's law, or other suitable estimated time-increase in memory capabilities. For example, the adversarial storage limit determination module 208A, in conjunction with the processor 204, can periodically increase the adversarial storage limit by a predetermined amount (e.g., adding a predetermined amount, doubling the adversarial storage limit, etc.) at a period of 3 months.

The key rotation period determination module 208B can include may comprise code or software, executable by the processor 204, for determining a cryptographic key rotation period. The key rotation period determination module 208B, in conjunction with the processor 204, can determine a cryptographic key rotation period based on at least an adversarial storage limit. In some embodiments, the key rotation period determination module 208B, in conjunction with the processor 204, can further determine the key rotation period based on the security value and the block cipher block size, in addition to the adversary storage limit.

For example, in some embodiments, the key rotation period determination module 208B, in conjunction with the processor 204, can determine the key rotation period q equal to:

$$q = \frac{\varepsilon * 2^n}{n * m} \quad (A)$$

where ε can be a security value, n can be a block size of a corresponding block cipher, and m can be an adversarial storage limit. The security value ε can include a value indicative of a security level. The security value ε can be of any suitable value which can result in an associated cryptographic process being secure. For example, the security value s can be equal to a value of $2^{-10}$ (which may be unitless), or any other value. In some cases, the security value can be characterized as a "security margin," which as is known in the art, is a measure for how much better a system needs to get at analyzing a cipher to break it. A security margin can be selected by a security expert, based upon a number of factors including the type of systems used, etc.

The block size n can include an amount of bits included in a block of a block cipher. Block ciphers can operate on a fixed length string of bits, where the length of the string of bits can be referred to as the block size n. The block size n can include any suitable size (e.g., the block size n may be 64 bits, 128 bits, 192 bits, 256 bits, etc.). The adversarial storage limit m can include a data storage limit of an adversary. The adversarial storage limit m can be an amount of data which the adversary (e.g., an adversarial computer, device, etc.) may store. As an illustrative example, the commercially available Amazon EC2 P3 sold by Amazon may have a storage limit m of $2^{40}$ Bytes of memory (e.g., approximately 1.5 TBytes or 1.2e+13 bits). In some embodiments, the units of $2^n$ may be considered as bits$^2$, since there may be $2^n$ bits$^2$ of the block cipher.

The cryptographic key generation module 208C can include may comprise code or software, executable by the processor 204, for generating cryptographic keys. The cryptographic key generation module 208C, in conjunction with the processor 204, can generate any suitable cryptographic keys. In some embodiments, the cryptographic key generation module 208C, in conjunction with the processor 204, can generate symmetric cryptographic keys. A symmetric cryptographic key can be a cryptographic key that is used for symmetric encryption. For example, a symmetric key may be used for both encryption of plain text and decryption of cipher text. A transmitting device may encrypt a message using the symmetric key and a receiving device may decrypt the encrypted message using the same symmetric key. The symmetric key, in practice, represents a shared secret between two or more computing devices that can be used to maintain private information. In some embodiments, the cryptographic key generation module 208C, in conjunction with the processor 204, can generate cryptographic keys based on AES, RSA, or any other suitable cryptosystem as known to one of skill in the art.

The network interface 206 may include an interface that can allow the key management computer 200 to communicate with external computers. The network interface 206 may enable the key management computer 200 to communicate data to and from another device (e.g., resource provider computers, authorization computers, key recipient computers, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

In some embodiments, the key management computer 200 can be operatively coupled to the cryptographic key database 220. The cryptographic key database 220 may securely store data, such as cryptographic keys. The cryptographic key database 220 may be a conventional, fault tolerant, relational, scalable, secure database such as those commercially available from Oracle™ or Sybase™.

III. Methods

Figure 3:
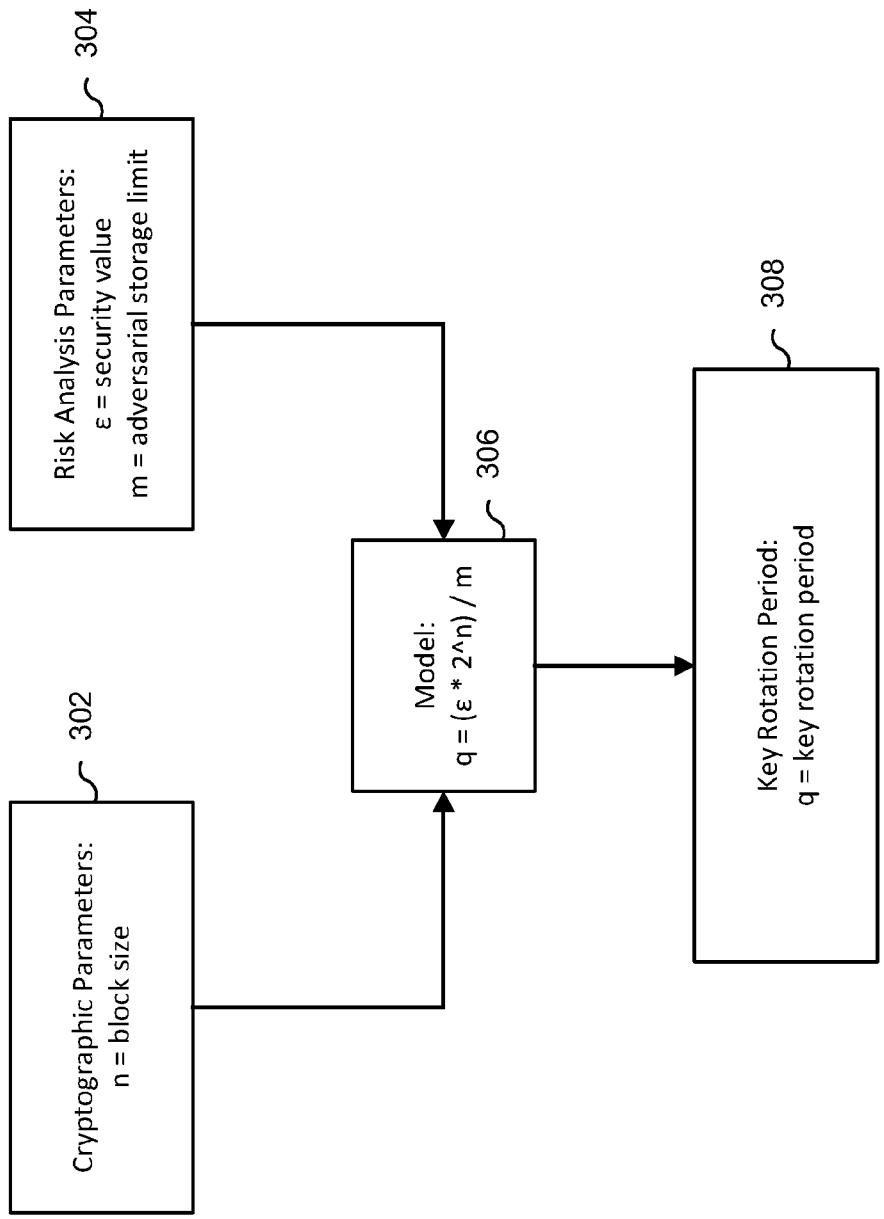
FIG. 3 shows a block diagram illustrating a process of determining a key rotation period according to embodiments.
Figure 4:
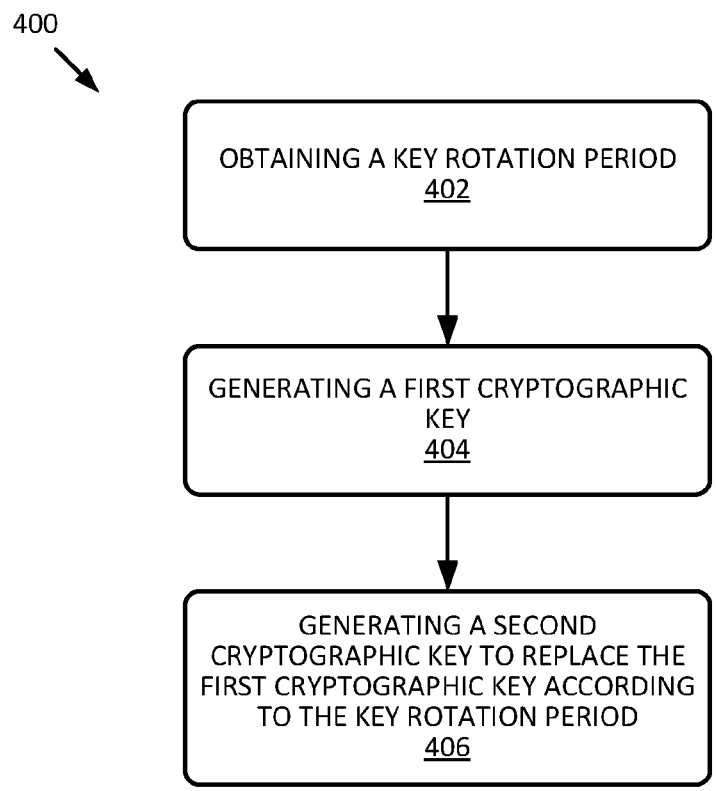
FIG. 4 shows a flow diagram illustrating a process for key rotation according to embodiments.

Embodiments can use the systems and apparatuses described above to securely obtain a key rotation period based on at least an adversarial storage limit. FIGS. 3-4 describe some examples of such methods. In some embodiments, the key management computer may include the key management computer 102 or 200 of FIGS. 1 and 2, respectively. The key recipient computer may include the first key recipient computer 104 or the Nth key recipient computer 106 of FIG. 1. Additional details and explanation of the key rotation technique will now be described.

A. Block Ciphers

A block cipher can encrypt a block of plaintext as a whole and can produces a ciphertext block of equal length. For example, a block cipher can take a fixed-length block of text of length b bits and a key as an input and produce a b-bit block of ciphertext. In some embodiments, a block size of 64 or 128 bits can be used.

A multitude of modes of operation can be employed to allow repeated use of a cryptographic key in a secure way. For example, there may be one mode, two modes, three modes, four modes, five modes, etc. In some embodiments, the situation in which five modes are utilized by a key management computer can allow for a wide variety of applications of encryption for which a block cipher could be used. The five modes of operation can include 1) electronic codebook (ECB), 2) cipher block chaining (CBC), 3) cipher feedback (CFB), 4) output feedback (OFB), and 5) counter (CTR).

Electronic codebook (ECB) can be considered the simplest mode, in which plaintext can be handled one block at a time. Each block of plaintext can be encrypted using the same key. The term codebook is used because, for a given cryptographic key, there may be a unique cipher text for every b-bit block of plaintext. As an illustrative example, the codebook may be a large group of bits in which there is an entry for every possible b-bit plaintext showing its corresponding ciphertext. For a message longer than b bits, the key management computer can break the message into b-bit blocks, encrypting the blocks as appropriate, and then in some embodiments, padding the last block.

In some embodiments, decryption may be performed one block at a time using the same cryptographic key. For example, a plaintext can consist of a sequence of b-bit blocks ($P_1$, $P_2$, . . . , $P_n$) the corresponding sequence of ciphertext blocks can be denoted as $C_1$, $C_2$, . . . , $C_n$.

In some embodiments, ECB can be defined as follows, where E can be an encryption function, D can be a decryption function, and K can be a cryptographic key, $$C_i = E(K, P_i) \; i=1, \ldots, N \quad (B)$$

$$P_i = D(K, C_i) \; i=1, \ldots, N \quad (C)$$

The ECB mode can be useful, for example, for a short amount of data such as an encryption key. A characteristic of ECB is that if the same b-bit block of plaintext appears more than once in the message, it always produces the same ciphertext.

B. Security Analysis

A security analysis can relate an attacker's success advantage in breaking a cryptographic protocol to the attacker's available resources. Current techniques in symmetric cryptography deal with a running time of an adversary. However, memory (in terms of fast random-access memory that can be used for fast computation) can be order of magnitude more constrained than computation. For example, an Amazon EC2 P3 instance (e.g., a commercially available cloud service sold by Amazon) has $2^{50}$ FLOPS and $2^{40}$ bytes of memory.

TABLE 1

Capacity of Amazon EC2 P3 instance

| Component | Amount |
| --- | --- |
| Computation (FLOPS) | 1.0 Pflops ≈ $2^{50}$ |
| Memory (bytes) | 1.5 Tbytes ≈ $2^{40}$ |

Block ciphers are one of the most widely used cryptographic primitives. A block cipher can usually be assumed to behave as a random function. In an analysis, this can be captured by a PRP/PRF switching lemma (i.e., pseudo random permutation (PRP) and pseudo random function (PRF)), which can state the following: A can be a random-access machine with m-bits of memory making q oracle queries. Let $F_n$ and $P_n$ be a uniform random function and permutation on n-bit strings, respectively. Then, $$Pr[A^{F_n} \Rightarrow 1] - Pr[A^{P_n} \Rightarrow 1] \leq \frac{q(q+1)}{2^{n+1}} \quad (D)$$

Techniques described herein provide a bound for the left-hand-side (of the above equation) in terms of the size of memory, m, of the random access machine A. A framework for analyzing memory-restricted adversaries can thus be developed and a clean positive result for PRP/PRF switching, in terms of time-memory trade-off can be provided.

A word random-access-machine (word RAM) model of computation can closely resemble modern computers. As such, symmetric cryptographic primitives can be analyzed in the ideal model, where adversaries can be computationally unbounded and the "running time" of the adversary is captured by the number of queries from ideal objects. As a result, the following adversary model can be derived.

An oracled random-access machine (RAM), A, having access to oracle O: $\{0,1\}^n \to \{0,1\}^n$, and with memory bound m is a finite sequence of instructions, $f_0, f_1, \ldots, f_q$, where for each i, $f_i$ is a function of the form $f_i$: $\{0,1\}^m \to \{0,1\}^m$.

Fixing an oracle O: $\{0,1\}^n \to \{0,1\}^n$, an execution of $A = f_0, f_1, \ldots, f_q$ can consist of a sequence of memory content $M_{0,0}, M_{1,0}, \ldots, M_{q,0} \; M_{q,1}$ which can be derived as follows.

$$0^m = M_{0,1} \xrightarrow{f_0} M_{0,1} \xrightarrow{o} M_{1,0} \xrightarrow{f_1} M_{1,1} \xrightarrow{o} \ldots \xrightarrow{o} M_{q,0} \xrightarrow{f_q} M_{q,1} \quad (E)$$

By convention, it can be the case that m n. Memory $M_{i,1}$ can be derived from $M_{i,0}$ by applying $f_i$. Memory $M_{i,0}$ can be derived from $M_{i-1,1}$ by applying O to the last n-bit of $M_{i-1,1}$. Finally, the last memory content, $M_{q,1}$, can be the output of $A^O$ (denoted $A^O \Rightarrow M_{q,1}$).

The above can yield the following theorem 1:

$$\varepsilon = Pr[A^{F_n} \Rightarrow 1] - Pr[A^{P_n} \Rightarrow 1] \leq \frac{q \cdot n \cdot m}{2^n} \quad (F)$$

The quantity being bounded (e.g., a security value ε) in Theorem 1 (e.g., Equation F) can be a quantity used in block ciphers, such as AES and 3DES, for encryption. In these applications, q can correspond to a number of block cipher calls of the encryption scheme. In some embodiments, the right hand side of the above theorem 1 may be further divided by n bits of the block size to determine q', which can correspond to the data limit of the encryption scheme, representing the maximum amount of data to be encrypted under a single key (e.g., until a new key is needed). The technique described herein allows a key management computer to relax the bound on the data limit when an appropriate bound on available memory of potential attackers is known.

FIG. 3 shows a block diagram illustrating a process of determining a key rotation period according to embodiments. FIG. 3 includes cryptographic parameters 302, risk analysis parameters 304, a model 306, and a key rotation period 308.

The cryptographic parameters 302 can include parameters for the model 306 which may relate to the cryptographic scheme utilized by the key management computer. For example, the cryptographic parameters 302 can include a block size n (e.g., in bits). The risk analysis parameters 304 can include parameters for the model 306 which may be based on a performed risk analysis and may depend upon the environment which the key management computer operates within. For example, the risk analysis parameters 304 can include a security value c (e.g., unitless) and an adversarial storage limit m (e.g., in bits). The cryptographic parameters 302 and the risk analysis parameters 304 can be input into the model 306 by the key management computer.

The model 306 can include a way in which the key management computer can obtain the key rotation period 308. For example, the model 306 can include an equation relating the cryptographic parameters 302 (e.g., the block size n) and the risk analysis parameters 304 (e.g., the security value ε and the adversarial storage limit m) to the key rotation period 308 (e.g., the key rotation period q). The key rotation period can include a value which can represent when to replace a first cryptographic key with a second cryptographic key (e.g., rotate the keys). The key rotation period q (e.g., number of calls, or in units of bits when the key rotation period is q') of FIG. 3 can specify a number of calls to a block cipher with the associated cryptographic key before rotating to a subsequent cryptographic key.

In some embodiments, the model 306 can further include an additional instance of the parameter or the block size n when determining the key rotation period q'. In this case, the key rotation period 308 can include a key rotation period q' (e.g., in bits) which can specify an amount of data encrypted by the cryptographic key before rotating to a subsequent cryptographic key. As an illustrative example, to determine the key rotation period q', the model may be $$q' = \frac{\varepsilon * 2^n}{m}.$$

In some embodiments, the model can include additional terms if a more specific mode of block cipher operation is chosen beyond ECB mode as described herein. For example, other modes may result in a model 306 in which an additional term may be added to the term of, for example, $$\frac{\varepsilon * 2^n}{m}.$$

The additional term may directly depend from the mode of operation selected.

C. Key Rotation Process

FIG. 4 shows a flow diagram illustrating a process 400 for key rotation, according to embodiments. The method illustrated in FIG. 4 will be described in the context of a key management computer obtaining a key rotation period and generating cryptographic keys which may be replaced based on the key rotation period. It is understood, however, that the invention can be applied to other circumstances regarding key rotation periods obtained based on at least an adversary storage limit. The process 400 of FIG. 4 may be performed by a key management computer (e.g., the key management computer 200 of FIG. 2).

Prior to step 402, the key management computer can obtain an adversarial storage limit m. The key management computer can obtain the adversarial storage limit m in any suitable manner, as described herein. In some embodiments, the adversarial storage limit m can be received as an input to process 400, or can be determined, for example, based on an assessment of the storage limit of available system components (e.g., available to an adversarial entity operating an adversary computer).

For example, the key management computer can obtain the adversarial storage limit m (e.g., as input) from a security team operating the key management computer. The key management computer can receive, as input, an adversarial storage limit m with a value of 1.5 TBytes. In some embodiments, the adversarial storage limit m may be a value less than 1.5 TBytes (e.g., 1 TBytes). In other embodiments, the adversarial storage limit m may be a value greater than 1.5 TBytes (e.g., 2 TBytes). For example, a larger value of an adversarial storage limit m may allow for greater security since an adversary may not be able (e.g., it may be more difficult) to break the encryption. Whereas, a smaller value of an adversarial storage limit m may allow for less security, but also a longer key rotation period, thus fewer cryptographic keys may be generated.

In other embodiments, the key management computer can periodically increase the adversarial storage limit m starting from a predetermined value. The key management computer can periodically increase the adversarial storage limit m based on, for example, Moore's law, or other suitable estimated time-increase in memory capabilities. For example, the key management computer can periodically increase the adversarial storage limit m by a predetermined amount (e.g., adding a predetermined amount, doubling the adversarial storage limit m, etc.) at a period of 2 months. For example, the key management computer can increase the value of the adversarial storage limit m from a starting value of 1.2 TBytes by a value of 0.05 TBytes, 0.1 TBytes, 0.5 TBytes, 0.75 TBytes, 1.0 TByte after a period of 1 month, 2 months, 6 months, 1 year, 2 years, etc. For example, in some embodiments, the adversarial storage limit m may be 1 petabyte or any other suitable value.

At step 402, the key management computer can obtain a key rotation period based on at least the adversarial storage limit m. For example, the key management computer can retrieve the adversarial storage limit m from a memory and can then obtain the key rotation period based on the adversarial storage limit m according to the process illustrated in FIG. 3. In other embodiments, the key management computer can further determine the key rotation period based on the security value $\varepsilon$ and the block cipher block size, in addition to the adversary storage limit.

As an illustrative example, the key management computer can obtain an adversarial storage limit m of $2^{40}$ bits from memory. The key management computer can also obtain a value of $2^{-10}$ for the security value $\varepsilon$ and a value of 128 for the block size n.

In some embodiments, the key rotation period can specify an encryption data limit for the first cryptographic key. In other embodiments, the key rotation period can specify a cipher call limit for the first cryptographic key.

In some embodiments, after obtaining the key rotation period, the key management computer can store the key rotation period in the memory.

At step 404, the key management computer can generate a first cryptographic key. The first cryptographic key can be used for data encryption and/or secured communications. For example, the cryptographic key man be a symmetric cryptographic key and may be generated according to block cipher cryptographic techniques.

In some embodiments, after generating the first cryptographic key, the key management computer can provide the first cryptographic key to a key recipient computer. The key recipient computer can utilize the first cryptographic key in any suitable manner. For example, the key recipient computer can encrypt data with the first cryptographic key.

In other embodiments, after generating the first cryptographic key, the key management computer can store the first cryptographic key in a cryptographic key database, which may be accessible by a plurality of key recipient computers.

In yet other embodiments, after generating the first cryptographic key, the key management computer can encrypt data with the first cryptographic key.

At step 406, the key management computer can generate a second cryptographic key to replace the first cryptographic key according to the determined key rotation period. For example, the second cryptographic key can be generated at, or before, the requirements indicated by the key rotation period have been meet (e.g., an amount of bits have been encrypted, a number of block cipher calls have been made, etc.) since the generation and/or use of the first cryptographic key.

In some embodiments, the key management computer can receive a cryptographic key request message from the key recipient computer. The key management computer can then provide a cryptographic key response message comprising the second cryptographic key to the key recipient computer. The key recipient computer can then, for example, encrypt additional data with the second cryptographic key.

In other embodiments, the key management computer can store the generated cryptographic keys into a cryptographic key database. A key recipient computer can retrieve the first cryptographic key and/or the second cryptographic key from the cryptographic key database at any suitable time.

Next, a comparative analysis between a previous best known analysis of determining a key rotation period for a cryptographic protocol and embodiments of the discloser is discussed. Embodiments provide for an improved key rotation period. As an illustrative example, the following Table 2 and Table 3 illustrate preliminary results and analysis of the data limit q in terms of transport layer security (TLS) (e.g., a cryptographic protocol which provides communication security over a computer network). The previously used TLS 1.3 is shown below:

$$\varepsilon = Adv_A^{prf} \leq \frac{q(q-1)}{2^{n+1}} \quad (G)$$

TABLE 2

| Key rotation period of previous methods | |
|---|---|
| TLS 1.3 (with previously best known analysis) | |
| Security (Adv) (e.g., ε) | $2^{-10}$ |
| Memory bound (m) | N/A |
| Key rotation period (q) | $2^{59.5}$ |

The following Table 3 shows TLS 1.3 with embodiments to determine the key rotation period q'.

$$\varepsilon = Adv_A^{prf} \leq \frac{q' \cdot m}{2^n} \quad (H)$$

TABLE 3

| Key rotation period of embodiments | |
|---|---|
| TLS 1.3 (with embodiments) | |
| Security (Adv) (e.g., ε) | $2^{-10}$ |
| Memory bound (m) | $2^{40}$ |
| Key rotation period (q') | $2^{70}$ |

Thus, embodiments allow for a larger data limit for the key rotation period q' (e.g., a value of $2^n$ bits rather than $2^{59.5}$ bits) before rotating cryptographic keys. Therefore, a given cryptographic key can be more efficient and able to encrypt more data before expiring.

The key management computer can determine a key rotation period, which may be based on a data limit, such as an encryption data limit. The key management computer can determine the key rotation period based on a block size of the block cipher in use and an adversarial storage limit m. In some embodiments, the key rotation period can also be based on a security value ε. For example, as shown in FIG. 3, the key management server can determine the key rotation period by computing $q'=\varepsilon*2^n/m$, where q is the key rotation period in bits, n is the block size in bits, E is the security value ε, and m is the adversarial storage limit m in bits.

In some embodiments, the key management computer can generate cryptographic keys, as described herein, that can have a key rotation period based on at least an adversarial storage limit m. The key management server can issue and/or provision the cryptographic keys to other computers. For example, the key management server can provision a symmetric key to a first key recipient computer and a second key recipient computer. The first key recipient computer and the second key recipient computer can then establish a secure communication channel with one another using the symmetric keys received from the key management server. In some embodiments, the key management computer can transmit the data limit (e.g., key rotation period) for the cryptographic key to the key recipient computers. The key recipient computers can then track the amount of data encrypted with the cryptographic key and can be capable of requesting a new cryptographic key as and/or when the amount of data encrypted approaches and/or reaches the data limit.

Embodiments of the invention have a number of advantages. For example, key rotation periods determined according to embodiments can allow for more data to be encrypted before the associated cryptographic key expires. In this way, the key management server can save computational power as it may not need to create cryptographic keys as often. For example, in reference to the above transport layer security (TLS) example, embodiments provide for a larger key rotation period than in the previously best known analysis. Thus, a key management computer may not need to generate as many cryptographic keys as was done with the previously best known methods and systems.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. Method comprising:
    obtaining, by a key management computer, a key rotation period based on at least an adversarial storage limit;
    generating, by the key management computer, a first cryptographic key;
    providing, by the key management computer, the first cryptographic key to a key recipient computer, wherein the key recipient computer encrypts data with the first cryptographic key;
    generating, by the key management computer, a second cryptographic key to replace the first cryptographic key according to the key rotation period;
    receiving, by the key management computer, a cryptographic key request message from the key recipient computer; and
    providing, by the key management computer, a cryptographic key response message comprising the second cryptographic key to the key recipient computer, wherein the key recipient computer encrypts additional data with the second cryptographic key,
    wherein the key rotation period is determined according to the following formula:

$$q = \frac{\varepsilon * 2^n}{n * m}$$

where q' is the key rotation period, ε is a security value, n is a block size of a corresponding block cipher, and m is the adversarial storage limit.

2. The method of claim 1, wherein the key rotation period specifies an encryption data limit for the first cryptographic key.

3. The method of claim 1, wherein the key rotation period specifies a cipher call limit for the first cryptographic key.

4. The method of claim 1, wherein obtaining the key rotation period based on at least the adversarial storage limit further comprises:
    obtaining, by the key management computer, the key rotation period based on at least the adversarial storage limit from a memory of the key management computer.

5. The method of claim 4 further comprising:
    obtaining, by the key management computer, the adversarial storage limit;
    and
    storing, by the key management computer, the key rotation period in the memory.

6. The method of claim 1 further comprising:
    storing, by the key management computer, the first cryptographic key and the second cryptographic key in a cryptographic key database.

7. The method of claim 1 further comprising:
    updating, by the key management computer, the adversarial storage limit after a predetermined amount of time.

8. A key management computer comprising:
    a processor; and
    a non-transitory computer-readable medium coupled to the processor, the non-transitory computer-readable medium comprising code executable by the processor for implementing a method comprising:
    obtaining a key rotation period based on at least an adversarial storage limit;
    generating a first cryptographic key;
    providing the first cryptographic key to a key recipient computer, wherein the key recipient computer encrypts data with the first cryptographic key;
    generating a second cryptographic key to replace the first cryptographic key according to the key rotation period;
    receiving a cryptographic key request message from the key recipient computer; and
    providing a cryptographic key response message comprising the second cryptographic key to the key recipient computer, wherein the key recipient computer encrypts additional data with the second cryptographic key,
    wherein the key rotation period is determined according to the following formula:

$$q' = \frac{\varepsilon * 2^n}{m}$$

where q is the key rotation period, ε is a security value, n is a block size of a corresponding block cipher, and m is the adversarial storage limit.

9. The key management computer of claim 8, wherein the method further comprises:
    an adversarial storage limit determination module;
    a key rotation period determination module; and
    a cryptographic key generation module.

10. The key management computer of claim 8 further comprising:
    a memory coupled to the processor, and wherein obtaining the key rotation period based on at least the adversarial storage limit further comprises:
    obtaining the key rotation period from the memory.

11. The key management computer of claim 10, wherein the method further comprises:
    obtaining the adversarial storage limit;
    and
    storing the key rotation period in the memory.

12. The key management computer of claim 8, wherein the method further comprises:
    updating the adversarial storage limit after a predetermined amount of time.

13. The key management computer of claim 8, wherein the key rotation period specifies an encryption data limit for the first cryptographic key.

14. The key management computer of claim 8, wherein the key rotation period specifies a cipher call limit for the first cryptographic key.

15. A key management computer comprising:
a processor; and
a non-transitory computer-readable medium coupled to the processor, the non-transitory computer-readable medium comprising code executable by the processor for implementing a method comprising:
obtaining a key rotation period based on at least an adversarial storage limit;
generating a first cryptographic key;
providing the first cryptographic key to a key recipient computer, wherein the key recipient computer encrypts data with the first cryptographic key;
generating a second cryptographic key to replace the first cryptographic key according to the key rotation period;
receiving a cryptographic key request message from the key recipient computer; and
providing a cryptographic key response message comprising the second cryptographic key to the key recipient computer, wherein the key recipient computer encrypts additional data with the second cryptographic key,
wherein the key rotation period is determined according to the following formula:

$$q = \frac{\varepsilon * 2^n}{n * m}$$

where q is the key rotation period, $\varepsilon$ is a security value, n is a block size of a corresponding block cipher, and m is the adversarial storage limit.

* * * * *